(12) United States Patent
Hall et al.

(10) Patent No.: US 7,497,675 B2
(45) Date of Patent: Mar. 3, 2009

(54) PISTON FOR A HPHT APPARATUS

(76) Inventors: David R. Hall, 2185 S. Larsen Parkway, Provo, UT (US) 84606; Scott Dahlgren, 2185 S. Larsen Parkway, Provo, UT (US) 84606; Timothy C. Duke, 2185 S. Larsen Parkway, Provo, UT (US) 84606

( * ) Notice: Subject to any disclaimer, the term of this patent is extended or adjusted under 35 U.S.C. 154(b) by 196 days.

(21) Appl. No.: 11/674,224

(22) Filed: Feb. 13, 2007

(65) Prior Publication Data

US 2008/0193580 A1 Aug. 14, 2008

Related U.S. Application Data

(63) Continuation of application No. 11/674,045, filed on Feb. 12, 2007.

(51) Int. Cl.
*B29C 43/02* (2006.01)
*B30B 7/00* (2006.01)

(52) U.S. Cl. .................................. 425/77; 425/330

(58) Field of Classification Search .................. 425/77, 425/330
See application file for complete search history.

(56) References Cited

U.S. PATENT DOCUMENTS 2,918,699 A 12/1959 Hall
2,968,837 A 1/1961 Zeitlin
3,093,862 A 6/1963 Gerard
3,159,876 A 12/1964 Hall
3,182,353 A 5/1965 Hall
3,255,490 A 6/1966 Sturn
3,257,688 A 6/1966 Levey
5,744,170 A 4/1998 Hall
5,780,139 A 7/1998 Carter
5,851,568 A 12/1998 Huang
6,022,206 A 2/2000 McNutt
6,186,763 B1 2/2001 Scanlan
6,336,802 B1 1/2002 Hall
2007/0009626 A1 1/2007 Hall

*Primary Examiner*—Yogendra Gupta
*Assistant Examiner*—Thu Khanh T Nguyen
(74) *Attorney, Agent, or Firm*—Tyson J. Wilde

(57) ABSTRACT

A cartridge assembly for connection to the frame of a high pressure, high temperature press, comprising a front end. The front end may comprise a back up with a conical portion intermediate and coaxial with an anvil and a piston. The anvil may comprise a proximal end in contact with the back-up and a distal end being adapted to form part of a pressurized chamber within the frame. The back-up may comprise a truncated cylinder comprising a first and second interface that are joined by a peripheral cylindrical wall. The cylindrical wall may also comprise a portion extending normally from the periphery of the first interface to a net concave portion of the cylindrical wall. The net concave portion may extend from the normal portion of the cylindrical wall to the periphery of the second interface which abuts the anvil.

20 Claims, 16 Drawing Sheets

PISTON FOR A HPHT APPARATUS

CROSS REFERENCE TO RELATED APPLICATIONS

In the Cross Reference to Related Applications, after "U.S. patent application Ser. No. 11/674,045 filed on Feb. 12, 2007", now pending.

BACKGROUND OF THE INVENTION

The current apparatus relates to HPHT press apparatuses that are used for a variety of purposes including the production of super hard materials such as synthetic diamond. Typically, the manufacturing or sintering process for super hard materials in a HPHT multi-axis press comprise of placing a payload inside a high-pressure, high-temperature, reaction cell. The reaction cell, made up of a pressure-transferring medium is placed within the press's high-pressure chamber and subjected to an ultra-high compressive force. During the press cycle, the pressure inside the cell must reach 35 kilobars, or more. Simultaneously, an electrical current is passed through the cell's resistance heating mechanism raising the temperature inside the cell to above 1000.degree. C. Once the super hard payload is subjected to sufficient pressure and temperature for a prescribed period of time, the current is terminated and the cell cooled. Pressure on the cell is then released, the anvils retracted, and the cell with its super hard payload removed from the press.

The amount of compressive forces a high pressure high temperature press can exert on a given reaction cell and consequently the maximum reaction cell size and payload, are limited by the reaction forces the press can endure without catastrophic failure. Most often, the size and mass of the press determines its threshold capabilities for tonnage before catastrophic failure occurs. For example, the weight of a tie-bar press with a tonnage rating of 3000 may exceed 60 tons. The weight of a 4000-ton tie bar press may exceed 100 tons. Moreover, large tonnage press types as described above are often expensive to construct and its efficiency is typically proportional to the duration of its cycle and volume of its payload.

BRIEF SUMMARY OF THE INVENTION

In one aspect of the present invention a cartridge assembly may be used for connection to the frame of a high pressure high temperature press, comprising a front end that may further comprise a back up intermediate and coaxial with an anvil and a piston.

In one aspect of the current invention the anvil may comprise a proximal end in contact with the back-up and a distal end may be adapted to form part of a pressurized chamber within the frame of the press. The anvil may comprise a cylindrical base connected to a tapered portion leading to a working face of the anvil opposite the base. The tapered portion may form a 35 to 55 degree angle with the cylindrical base while the working face may comprise a first surface area which is substantially parallel with the base. The anvil may also comprise a chamfered region with a second surface area forming a 0.5 to 3.5 degree angle with the tapered portion and may be connected to the working face to form a frustopyramidal shape wherein the second surface area may comprise a greater surface area than the first surface area.

In another aspect of the current invention the back-up may comprise a truncated cylinder comprising a first and second interface that are joined by a peripheral cylindrical wall. The cylindrical wall may comprise a portion extending normally from the periphery of the first interface to a net concave portion of the cylindrical wall. The net concave portion may extend from the normal portion of the cylindrical wall to the periphery of the second interface. The net concave portion of the backup may provide a means of effectively distributing load stresses towards the cylindrical base of the anvil thus reducing the amount of shoulder loading frequently experienced in similar presses which may cause stress fractures and subsequently cause the press to fail. Specifically, the net concave portion may enable the backup to effectively redirect and concentrate stress lines from the first interface, which may comprise a generally larger diameter, towards the second interface, such that the second interface comprises a significantly stress matched interface, despite a smaller diameter, that is able to distribute equal amounts of pressure across the cylindrical base of the anvil.

In yet another aspect of the current invention a hydraulic system may be adapted to apply axial pressure to the backup through the piston wherein a central portion of the piston may comprise an axial thickness approximately equal to the axial length of the backup.

DETAILED DESCRIPTION OF THE INVENTION AND THE PREFERRED EMBODIMENT

Figure 1:
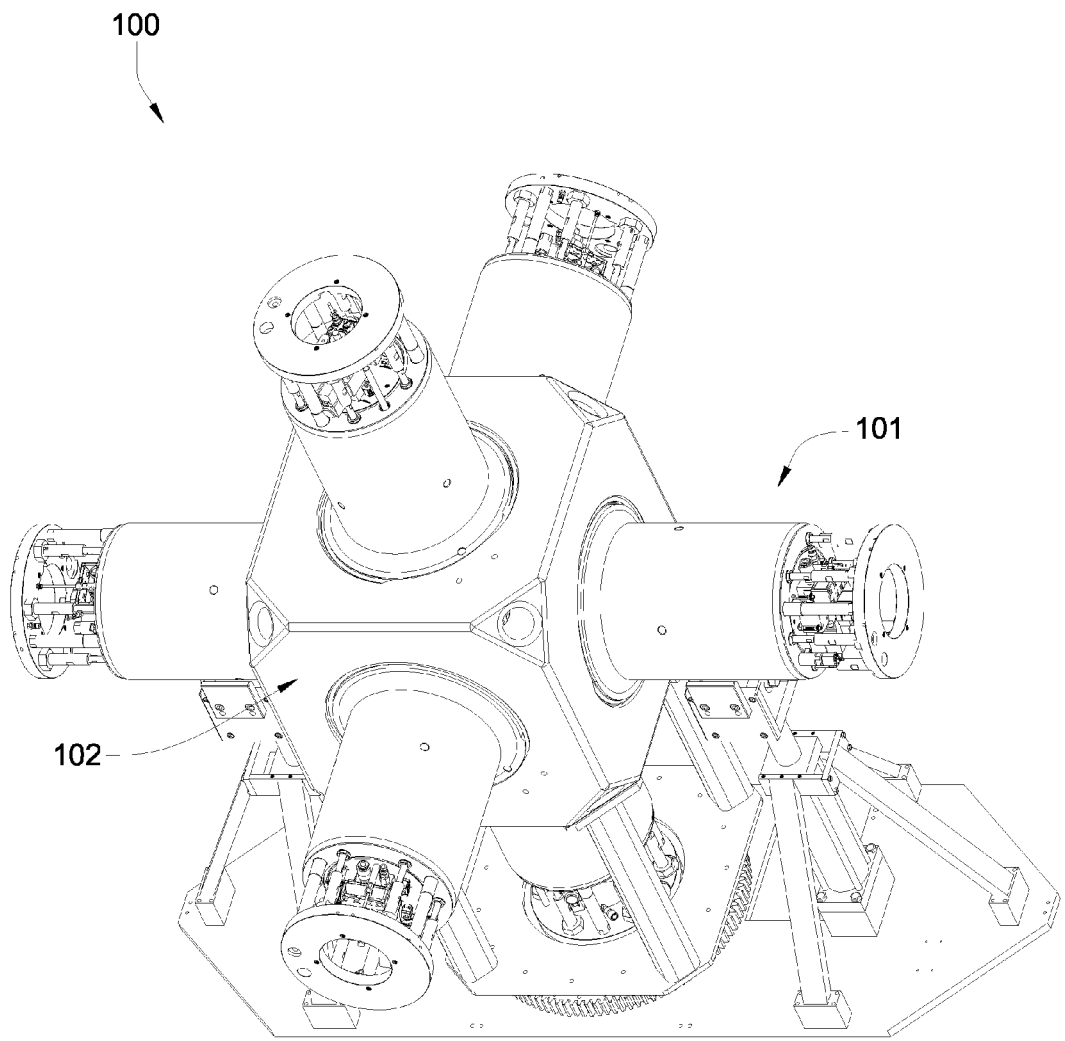
FIG. 1 is a perspective diagram depicting an embodiment of a high pressure, high temperature multi axis press apparatus.

FIG. 1 is a perspective diagram depicting an embodiment of a high pressure, high temperature press 100. In a preferred embodiment the high pressure, high temperature press 100 may comprise six cartridge assemblies 101 that are connected to a press frame 102. The cartridge assemblies 101 may converge within a central portion of the press frame 102 to form a pressurized chamber that may be utilized to form super hard materials such as synthetic diamond or cubic boron nitride.

Figure 2:
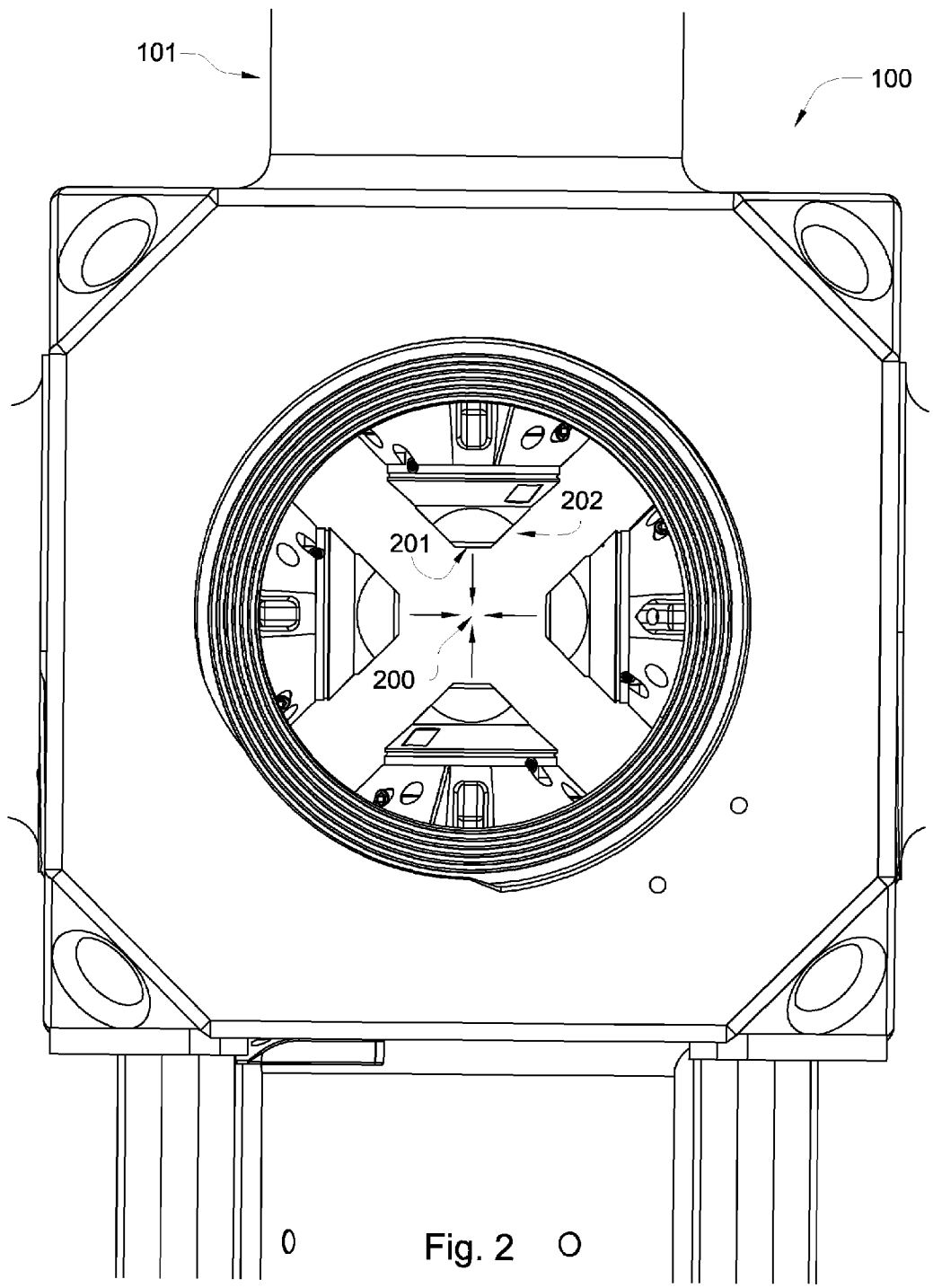
FIG. 2 is another perspective diagram depicting an embodiment of a high pressure, high temperature multi axis press apparatus.

FIG. 2 is a perspective diagram depicting an embodiment of a pressurized chamber 200 that may be formed when the distal ends 201 of the anvils 202 attached to the cartridge assemblies 101 are adapted to converge within a central portion of the press frame 102. In a preferred embodiment the pressurized chamber 200 may comprise six anvils 202 that form the polyhedron geometry of the pressurized chamber 200. In other embodiments the pressurized chamber 200 may comprise at least four anvils 202. The pressurized chamber 200 may be utilized to create and sustain an environment for a period of time that comprises high pressures and high temperatures that are especially conducive for the production of super hard material.

Figure 3:
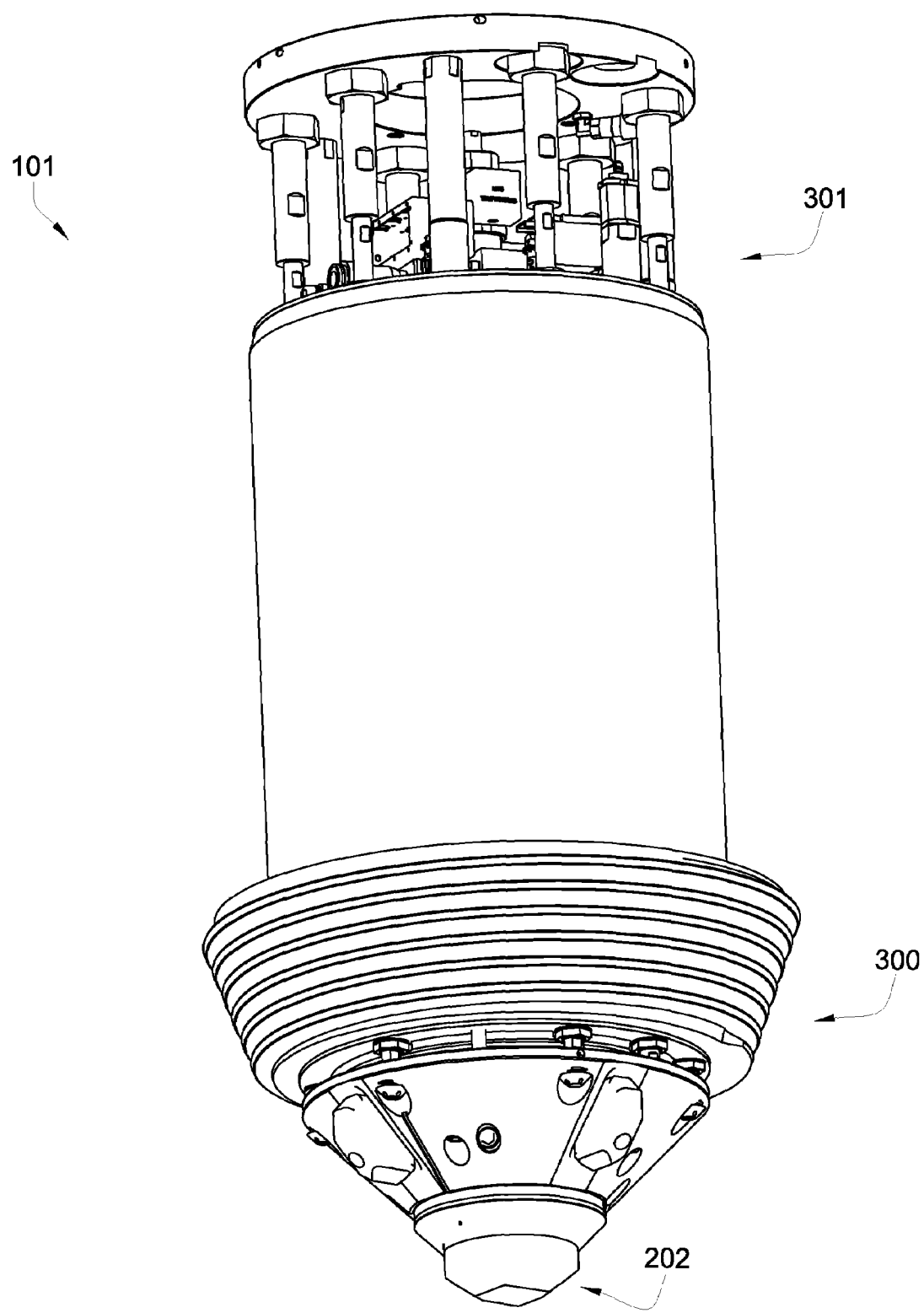
FIG. 3 is a perspective diagram of an embodiment depicting the front and back end of a cartridge assembly.

FIG. 3 is a perspective diagram of an embodiment of the current invention depicting the exterior portion of a cartridge assembly 101 which may comprise a front end 300 and back end 301. The front end 300 may be in communication with the back end 301, wherein the back end 301 may comprise a means of housing hydraulic and electronic circuitry used to produce the required pressures and temperatures for the production of super hard material.

Figure 4:
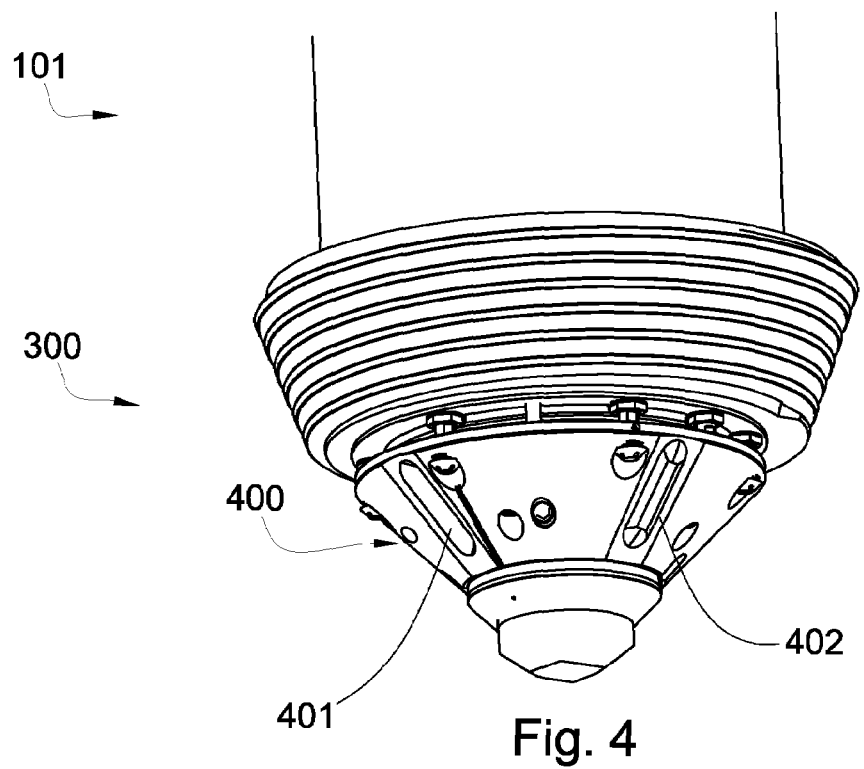
FIG. 4 is another perspective diagram of an embodiment depicting the front end of a cartridge assembly.

FIG. 4 is another perspective diagram of an embodiment of a cartridge assembly 101 depicting a front end 300 which may comprise a key ring 400 that further comprises at least one key slot 401 that may be adapted for receiving at least one interfacing key 402 from an adjacent cartridge assembly 101 when attached to the press frame. The at least one key slot 401 and at least one interfacing key 402 may be disposed generally around a portion of the circumference of the key ring 400. In a preferred embodiment the key slots 401 and interfacing keys 402 may serve to substantially hold the cartridge assemblies 101 in place during operation of the press 100 and help to prevent the cartridge assemblies 101 from becoming misaligned and/or disconnected.

Figure 5:
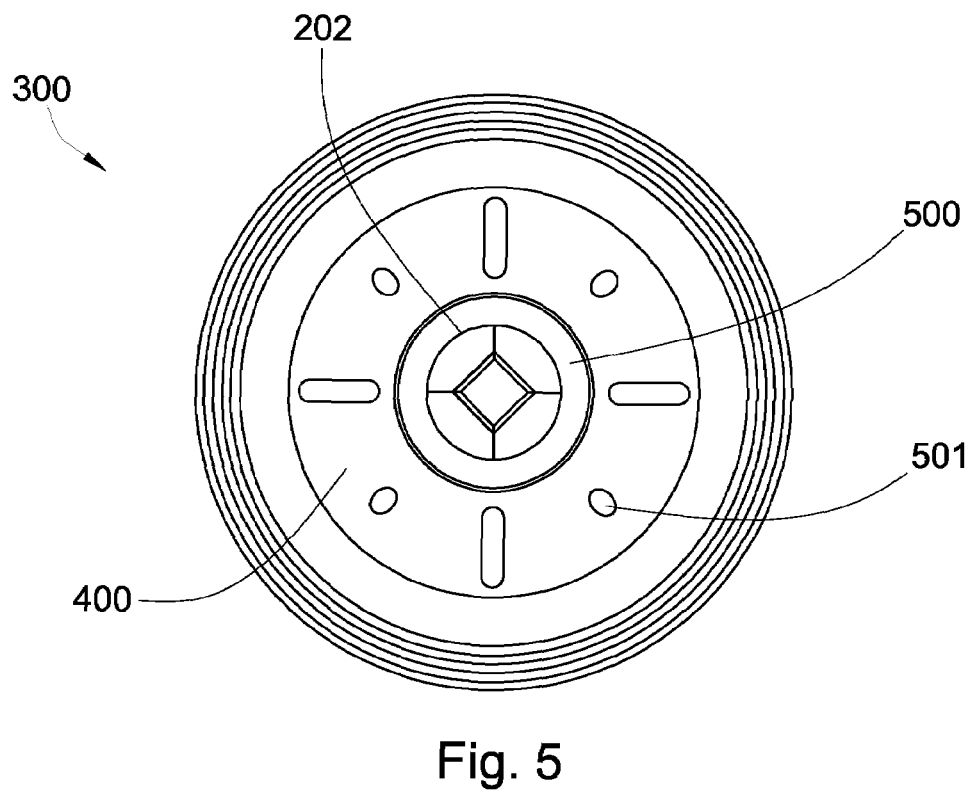
FIG. 5 is top perspective diagram of an embodiment depicting the front end of a cartridge assembly.

FIG. 5 is a top down perspective diagram of an embodiment of the current invention depicting a front end 300 that may comprise a centering assembly 500 that may be encompassed by a key ring 400. In some embodiments the key ring 400 may comprise a plurality of receptacles 501 for receiving a plurality of locking pins that may be adapted to center the centering assembly 500. Preferably there are at least 3 to 4 locking pins. In other embodiments locking pins may also be adapted to center the anvil 202. In a preferred embodiment the centering assembly 500 may comprise at least three receptacles 501 for receiving the locking pins that may also be adapted to center the centering assembly 500 within the key ring 400. In some embodiments the ability to ensure that the anvils 202 are substantially aligned within the pressurized chamber may assist to provide proper sealing between anvils and substantially reduce the probability of shoulder loading and/or stress fractures.

Figure 6:
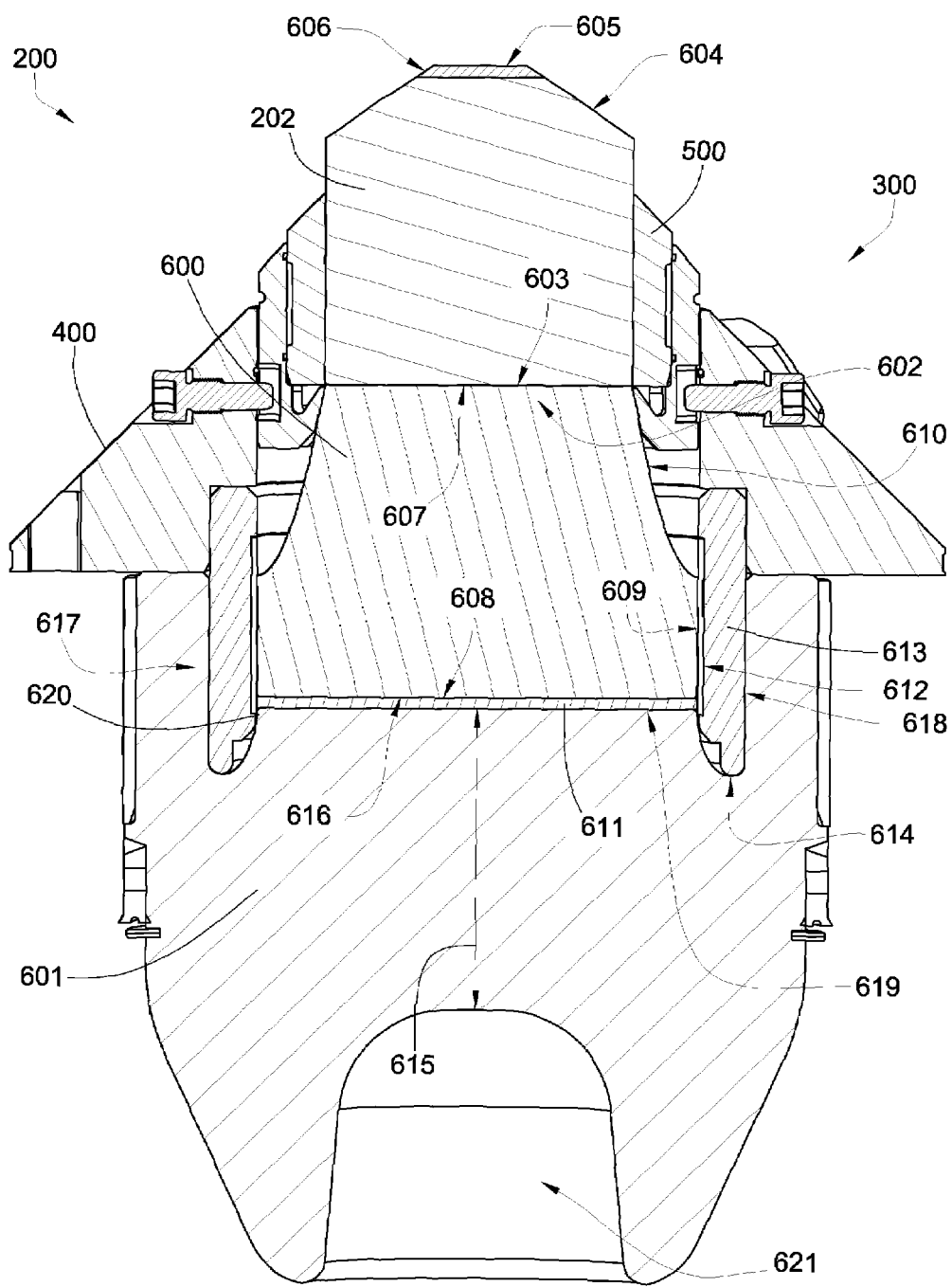
FIG. 6 is a cross sectional diagram of an embodiment depicting a cartridge assembly.

FIG. 6 is a cross sectional diagram of the current invention depicting an embodiment of the front end 300 of a cartridge assembly 101 comprising a back-up 600 intermediate and coaxial with an anvil 202 and a piston 601.

In a preferred embodiment the anvil 202 may comprise a proximal end 602 in contact with the back-up 600 and a distal end 201 that may be adapted to form part of a pressurized chamber 200 within the frame 102. The anvil 202 may comprise a cylindrical base 603 connected to a tapered portion 604 leading to a working face 605 of the anvil opposite the base. The tapered portion 604 may form a 35 to 55 degree angle with the cylindrical base 603 while the working face 605 may comprise a first surface area which is substantially parallel with the base. The anvil 202 may also comprise a chamfered region 606 with a second surface area forming a 0.5 to 3.5 degree angle with the tapered portion 604 and may be connected to the working face 605 to form a frusto-pyramidal shape, wherein the second surface area may comprise a greater surface area than the first surface area. In some embodiments the second surface area of the anvil 202 may be adapted to receive any excess payload that may extrude from the pressurized chamber 200 during a press cycle and may be subsequently utilized to form a natural gasket to prevent loss of pressure. The unique geometry of the chamfered region 606 may also assist to reduce the effects of shoulder loading between anvils.

In another embodiment, the back-up 600 may comprise a truncated cylinder comprising a first interface 607 and second interface 608 that are joined by a peripheral cylindrical wall 609. The back-up may comprise a hard material selected from the group consisting of refractory metals, carbides, tungsten carbides, niobium, titanium, platinum, molybdenum or combinations thereof. The cylindrical wall 609 may comprise a portion extending normally from the periphery of the first interface 607 to a concave portion 610 of the cylindrical wall 609. A layer of electrical insulation 611 may be disposed around the periphery of the cylindrical wall 609 while an electrical insulated ring 612 may also be disposed around the cylindrical wall 609, wherein the back-up 600 may be substantially insulated from the piston 601. In some embodiments the ability to effectively insulate the back-up 600 may be critical for achieving the proper charge through the anvil 202 to produce the required temperature in the pressurized chamber 200. The concave portion 610 of the back-up 600 may extend from the normal portion of the cylindrical wall 609 to the periphery of the second interface 608. In some embodiments the concave portion 610 that may comprise a conic geometry. Using the conic form factor where 0.5 is point to point and 1 is point to intersect and v2/2 defining a round our concave conic form factors may have a range from 0.6 to 0.9. The concave portion 610 of the backup 600 may provide a means of effectively distributing load stresses towards the cylindrical base 603 of the anvil 202 which may reduce the amount of shoulder loading frequently experienced in similar presses which may cause stress fractures and subsequently cause the press to fail. Specifically, the concave portion 610 may enable the backup 600 to effectively direct and concentrate stress lines from the first interface 607 towards the second interface 608, such that the second interface 608 comprises a significantly stress matched interface. In another embodiment a centering ring 613 may be disposed around the first interface 607 of the back-up 600 wherein at least a portion of a centering ring 613 may also be disposed within the concavity 614 of the piston 601.

In yet another embodiment a hydraulic system (not shown) may be adapted to apply axial pressure to the backup 600 through the piston 601 wherein a central portion 615 of the piston 601 may comprise an axial thickness approximately equal to the axial length of the backup 600. The proximal end 616 of the back-up 600 may fit within a recess 617 formed in the piston 601 wherein the recess 617 may comprise a cylindrical side wall 618 and a bottom floor 619. In some embodiments a corner 620 between the bottom floor 619 and the side wall 618 may comprise a conic form factor of 0.6 to 0.9 and the sidewall 618 may also be in contact with the key ring 400. In other embodiments the corner 620 between the bottom floor 619 and the side wall 618 may comprise a conic form factor of 0.6 to 0.9. and the corner 620 may form a concavity 614 in the bottom floor 619. The concavity 614 may comprise a depth of approximately 10 to 33 percent of the axial length of the side wall 618, the depth being approximately twice the width of the concavity 614. The piston 601 may further comprise an open cavity 621 formed in the opposite end, proximate the back-up 600 wherein the cavity 621 may comprise a depth of about 50 to 90 percent of the depth of the axial thickness of the central portion 615 of the piston 601 and a width of about 75 to 125 percent the depth. In some embodiments the axial thickness of the central portion 615 of the piston 601 may be 40 to 80 percent the radial thickness of the piston 601. In a preferred embodiment the piston 601 may comprise a geometry such that when the hydraulic system applies axial pressure through the piston 601, the end of the piston 601 distributes the load substantially evenly across a cross sectional area of the proximal end 616 of the back-up 600. In yet other embodiments the proximal end of the back-up 600 may comprise a geometry such that when the hydraulic system applies the axial pressure through the piston 601, the piston 601 may distribute the load substantially evenly across a cross sectional area of the proximal end 616 of the back-up 600.

Figure 7:
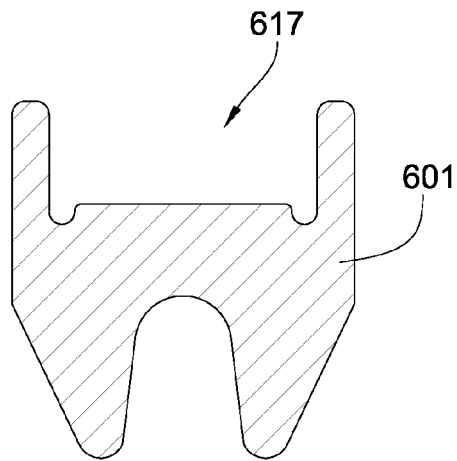
FIG. 7 is a cross sectional diagram of an embodiment of a piston.
Figure 8:
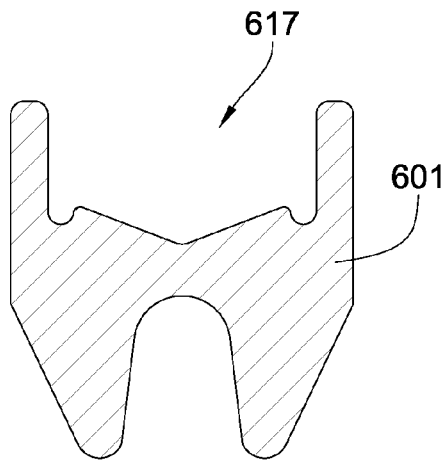
FIG. 8 is another cross sectional diagram of an embodiment of a piston.
Figure 9:
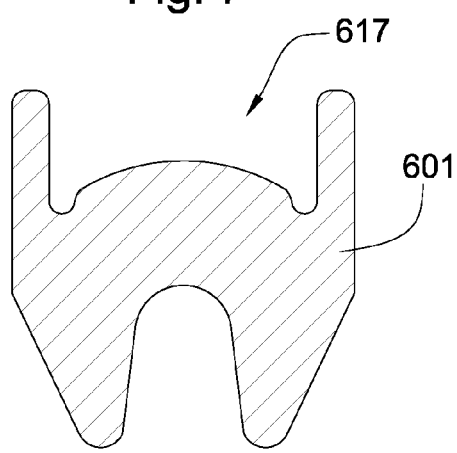
FIG. 9 is another cross sectional diagram of an embodiment of a piston.
Figure 10:
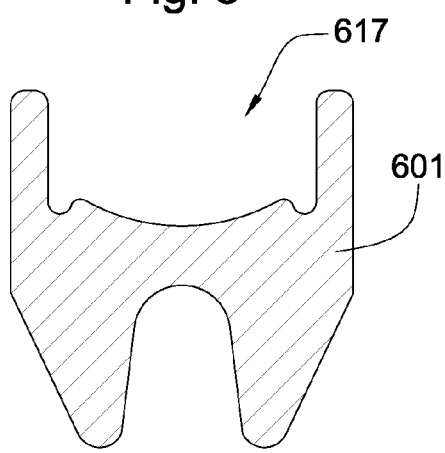
FIG. 10 is another cross sectional diagram of an embodiment of a piston.
Figure 11:
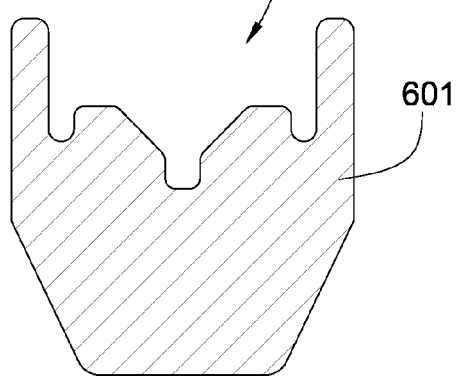
FIG. 11 is another cross sectional diagram of an embodiment of a piston.
Figure 12:
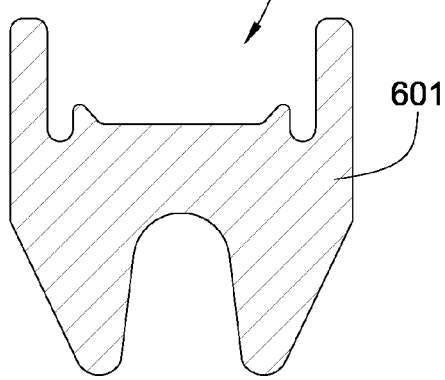
FIG. 12 is another cross sectional diagram of an embodiment of a piston.

FIGS. 7-12 are cross sectional diagrams of embodiments of various geometries of the recess portion 617 of a piston 601. In a preferred embodiment the recess portion 617 may comprise a generally flat geometry as shown in FIG. 7. In other embodiments the recess portion 617 may comprise a generally inverted triangular shape as shown in FIG. 8, a generally domed shape as shown in FIG. 9, a generally scoop shape as shown in FIG. 10, a generally frustoconical shape as shown in FIG. 11, an inverted chamfer as shown in FIG. 12, or combinations thereof. The various geometries may further assist to substantially distribute stress loads across the recess portion 617 of the piston 601 in an effort to reduce shoulder loading or stress fractures and to provide a substantially stress matched interface.

Figure 13:
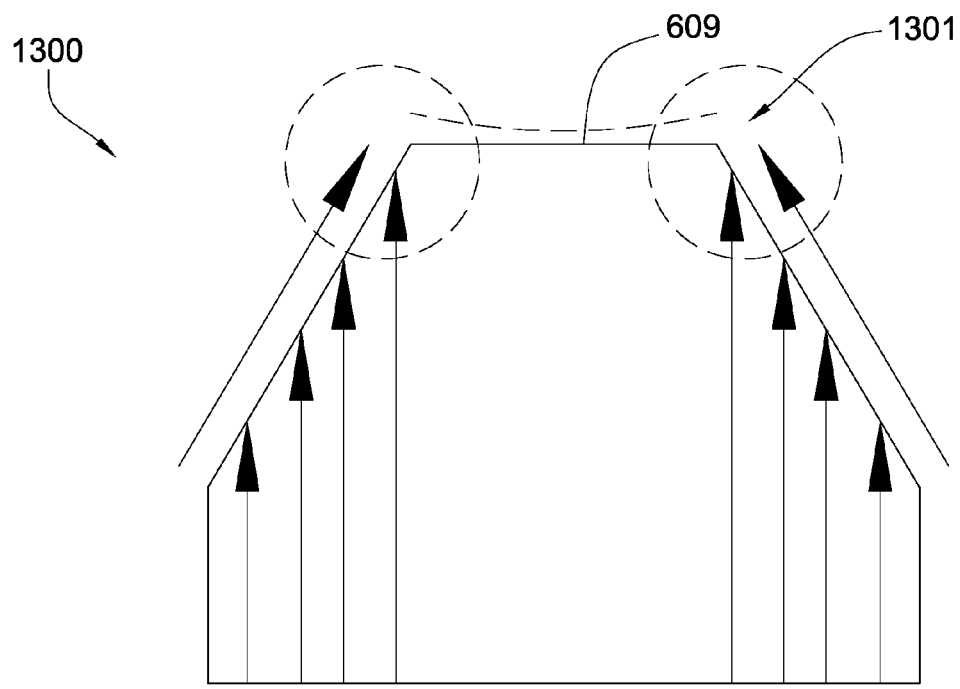
FIG. 13 is a cross sectional diagram depicting a prior art back-up.
Figure 14:
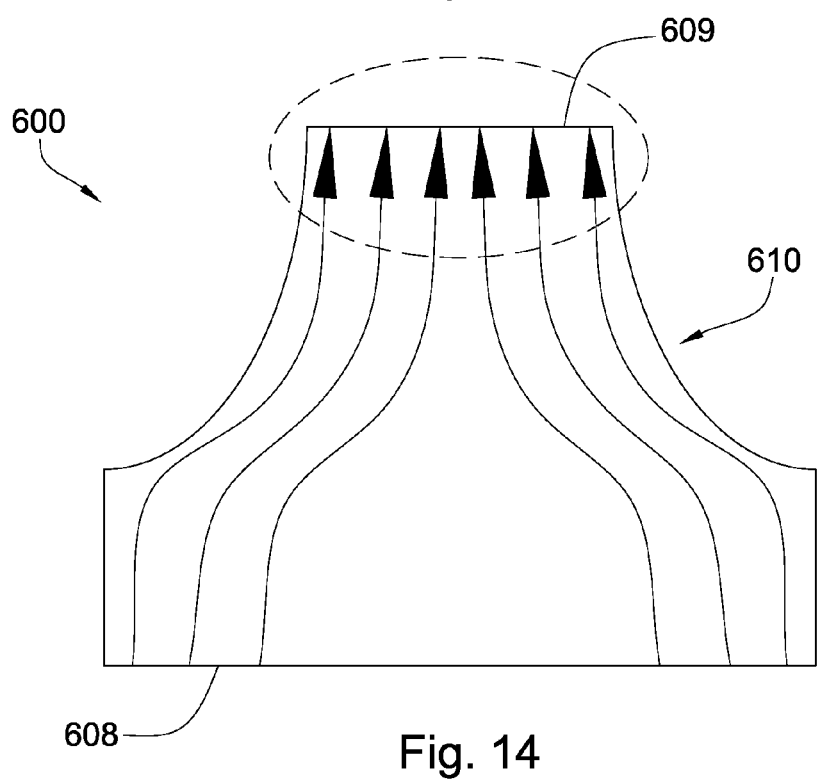
FIG. 14 is another cross sectional diagram of the current invention depicting stress lines distributed through a backup.

FIGS. 13-14 are cross sectional diagrams depicting the comparisons between stress loads affecting the back-up 1300 of prior art and the back-up 600 of the current invention. FIG. 13 specifically depicts how stress loads may be displaced in a back-up 1300 of prior art which may be directed towards the corner portions 1301 of the second interface 608. This may cause the second interface 609 to bend which may break the back-up. FIG. 14 depicts how a back-up 600 of the current invention comprising a concave portion 610 with a conic geometry may effectively direct load stresses substantially evenly across the interfaces 608, 609. Substantially even loading will mitigate bending and preserve the life of the back-up.

Figure 15:
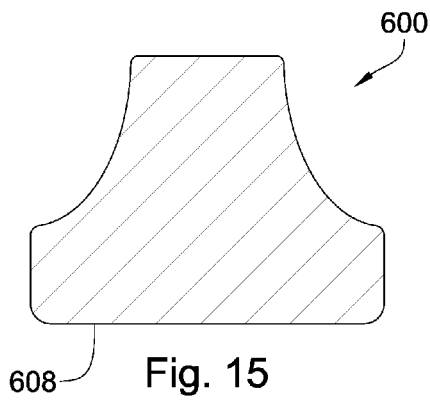
FIG. 15 is a cross sectional diagram of an embodiment depicting the first interface of a back-up.
Figure 16:
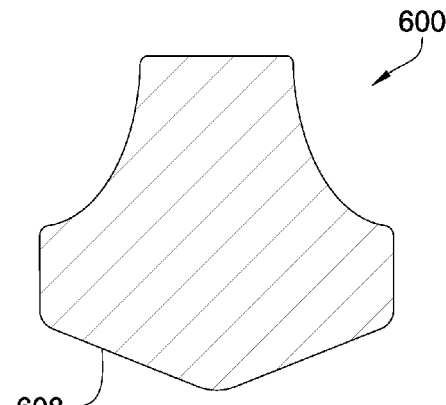
FIG. 16 is a cross sectional diagram of an embodiment depicting the first interface of a back-up.
Figure 17:
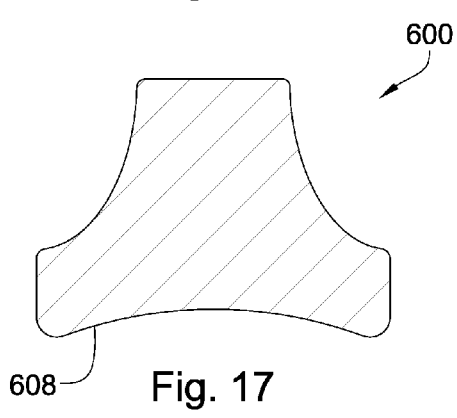
FIG. 17 is another cross sectional diagram of an embodiment depicting the first interface of a back-up.
Figure 18:
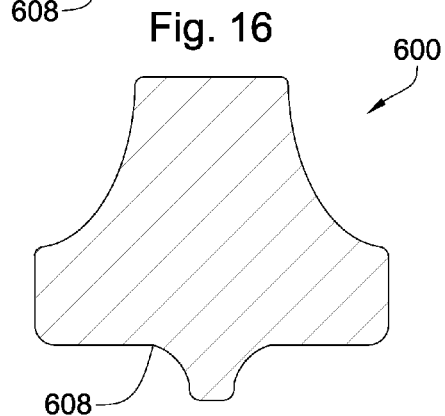
FIG. 18 is another cross sectional diagram of an embodiment depicting the first interface of a back-up.
Figure 19:
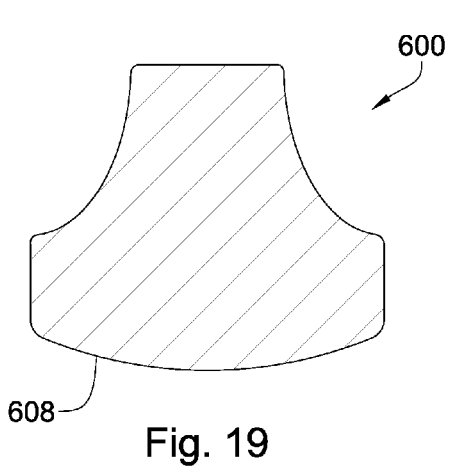
FIG. 19 is another cross sectional diagram of an embodiment depicting the first interface of a back-up.
Figure 20:
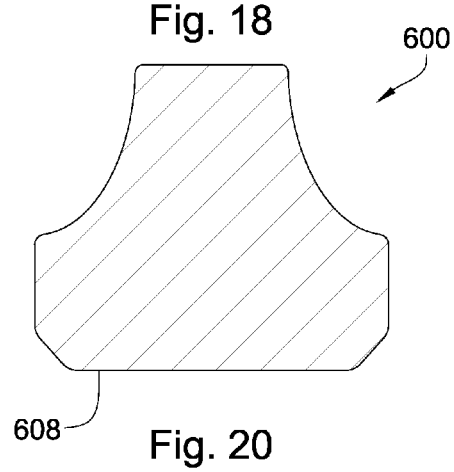
FIG. 20 is another cross sectional diagram of an embodiment depicting the first interface of a back-up.

FIGS. 15-20 are cross sectional diagrams of embodiments of various geometries of the first interface 608 of a back-up 600. In a preferred embodiment the first interface 608 may comprise a generally flat shape as shown in FIG. 15. In other embodiments the first interface 608 may comprise a generally triangular shape as shown in FIG. 16, a generally scoop shape as shown in FIG. 17, a generally frustoconical shape as shown in FIG. 18, a generally dome shape as shown in FIG. 19, a chamfer as shown in FIG. 20, or combinations thereof. The various geometries may further assist to substantially redistribute stress loads across the first interface 608 of the back-up 600 in an effort to reduce shoulder loading or stress fractures and to provide a substantially stress matched interface.

Figure 21:
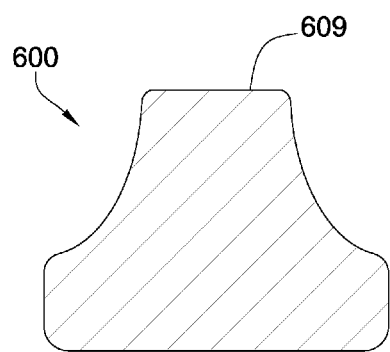
FIG. 21 is another cross sectional diagram of an embodiment depicting the first interface of a back-up.
Figure 22:
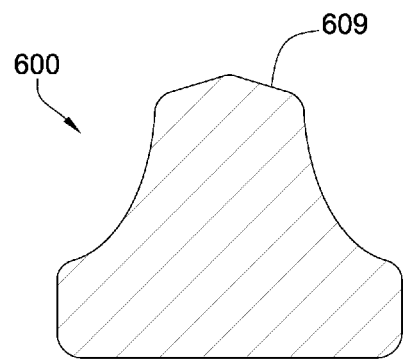
FIG. 22 is a cross sectional diagram of an embodiment depicting the second interface of a back-up.
Figure 23:
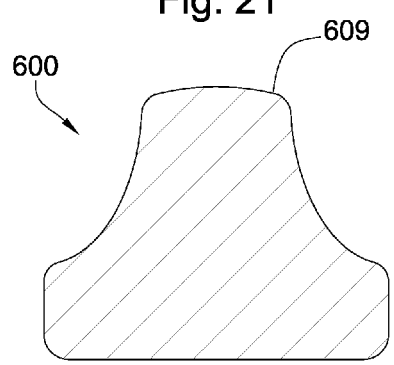
FIG. 23 is another cross sectional diagram of an embodiment depicting the second interface of a back-up.
Figure 24:
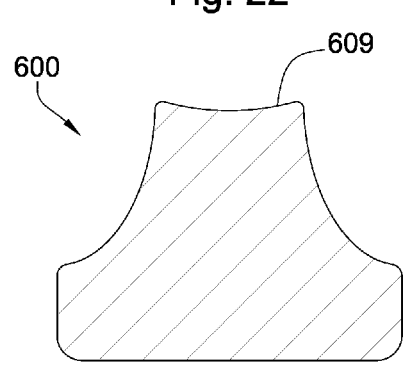
FIG. 24 is another cross sectional diagram of an embodiment depicting the second interface of a back-up.
Figure 25:
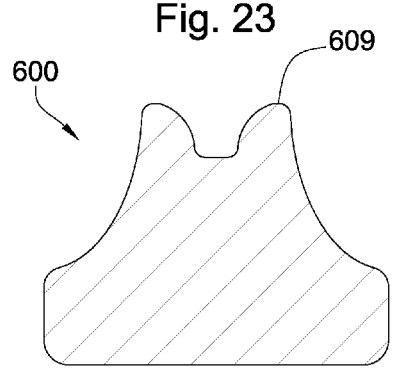
FIG. 25 is another cross sectional diagram of an embodiment depicting the second interface of a back-up.
Figure 26:
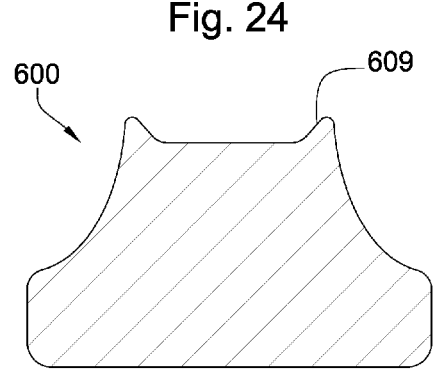
FIG. 26 is another cross sectional diagram of an embodiment depicting the second interface of a back-up.

FIGS. 21-26 are cross sectional diagrams of embodiments of various geometries of the second interface 609 of a back-up 600. In a preferred embodiment the second interface 609 may comprise a generally flat shape as shown in FIG. 21. In other embodiments the second interface 609 may comprise a generally triangular shape as shown in FIG. 22, a generally domed shape as shown in FIG. 23, a generally scoop shape as shown in FIG. 24, a generally frustoconical shape as shown in FIG. 25, an inverted chamfer as shown in FIG. 26, or combinations thereof. The various geometries may further assist to substantially redistribute stress loads across the second interface 609 of the back-up 600 in an effort to reduce shoulder loading or stress fractures and to provide a substantially stress matched interface. In a preferred embodiment the second interface 609 may comprise a generally a geometry that corresponds to the geometry of the cylindrical base 603 of the anvil 202.

Figure 27:
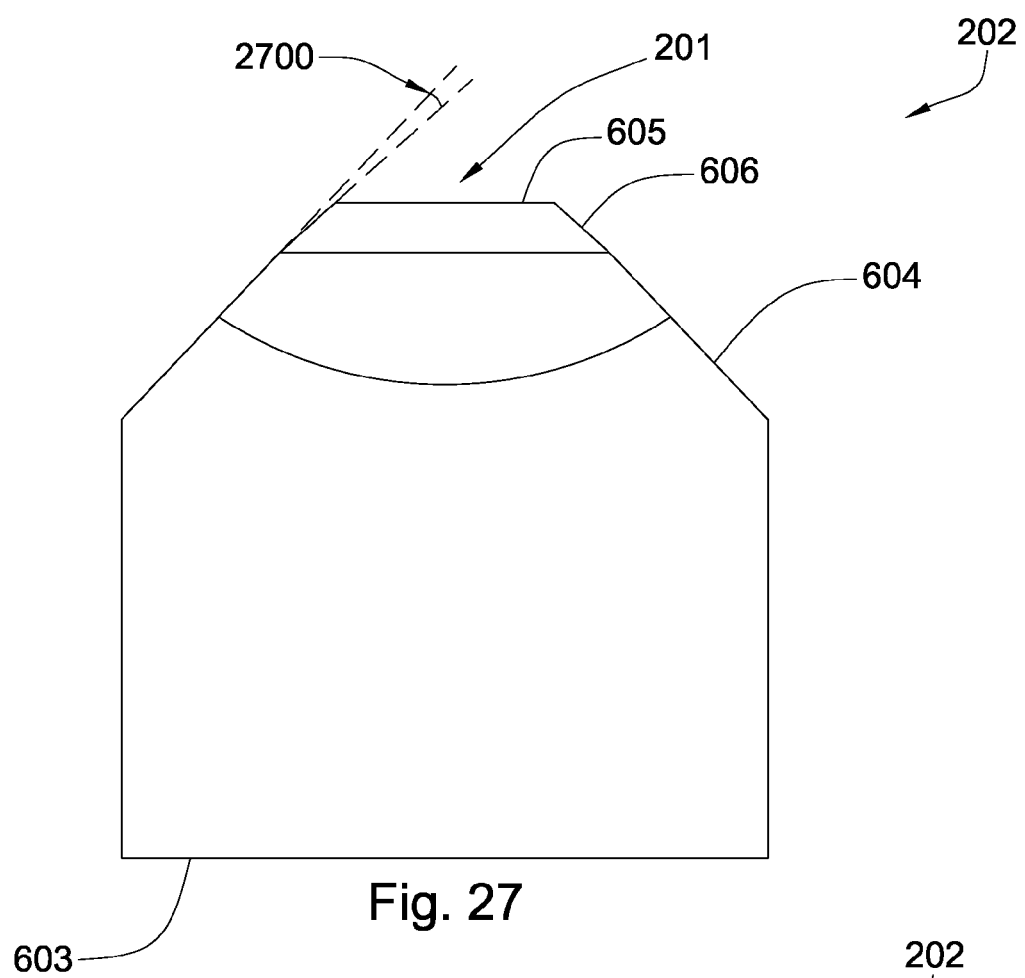
FIG. 27 is a cross sectional diagram of an embodiment depicting an anvil.

FIG. 27 is a perspective diagram of an embodiment of the current invention depicting an anvil 202 which may comprise a material selected from the following consisting a cemented metal carbide, tungsten carbide, or combinations thereof. The anvil 202 may comprise a cylindrical base 603 connected to a tapered portion 604 leading to a working face 605 of the anvil 202 opposite the base. In some embodiments the tapered portion 604 may form a 45 degree angle with the cylindrical base 603 while the chamfered region 606 may comprise a second surface area that substantially forms a 2.5 degree angle 2700 with the tapered portion 604. In other embodiments the anvil 202 may comprise a generally frusto-pyramidal shape comprising rounded corners further comprising a conic form factor of 0.6 to 0.9. In some embodiments the anvil 202 may comprise a distal end 201 which is adapted to form a part of a pressurized chamber within the press frame.

Figure 28:
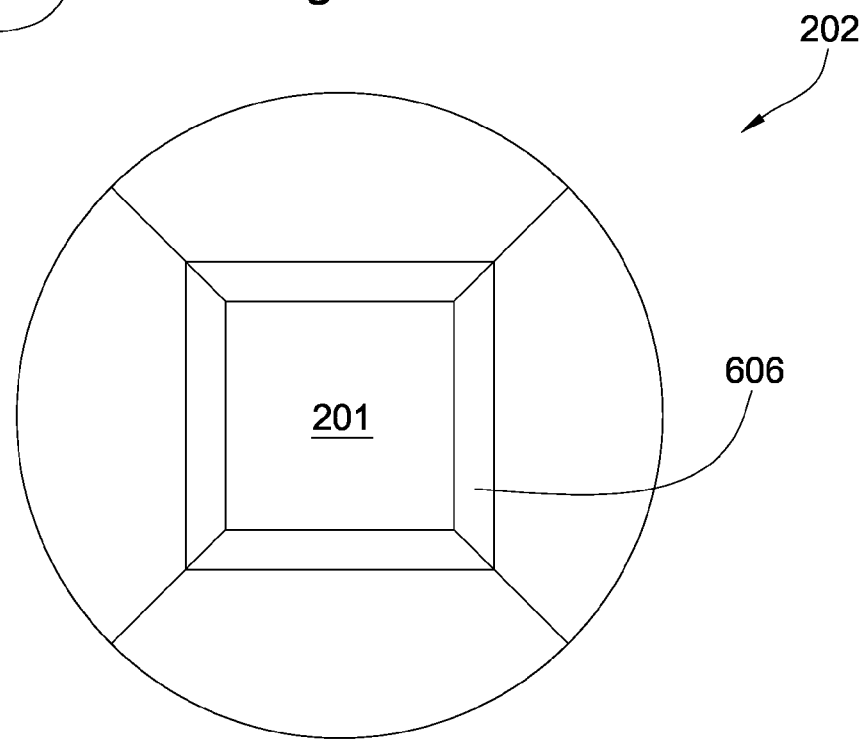
FIG. 28 is a cross sectional diagram of an embodiment depicting an anvil.

FIG. 28 is a top perspective diagram of an embodiment depicting an anvil 202. The anvil 202 may comprise a chamfered region 606 that comprises a second surface area that is 1.1 to 2.5 times greater than the first surface area of the working face. In a preferred embodiment the second surface area may comprise a surface area 1.5 times greater than the first surface area. In other embodiments the anvil 202 may comprise a chamfered region 606 that forms a wedge area for receiving excess payload that may extrude from the pressurized chamber 200 and form a gasket when the anvils 202 are brought together within the press 100 during operation.

Figure 29:
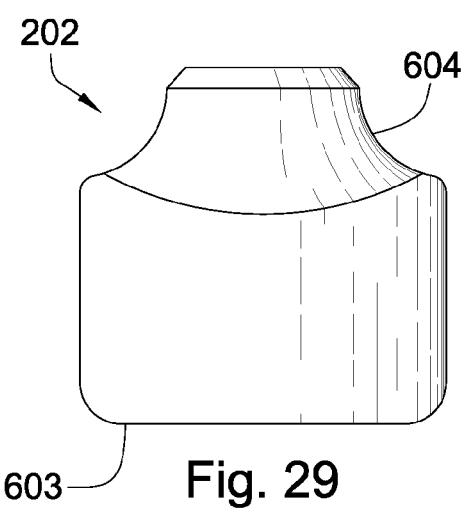
FIG. 29 is a top perspective diagram of an embodiment depicting an anvil.

FIG. 29 is a cross sectional diagram of an embodiment of the current invention depicting an anvil 202 that may comprise a cylindrical base 603 comprising a flat geometry and a tapered portion 604 that may comprise a conic geometry 3000. The conic geometry may assist the anvil 202 to redirect stress loading towards the pressurized chamber and assist to reduce the probability of shoulder loading.

Figure 30:
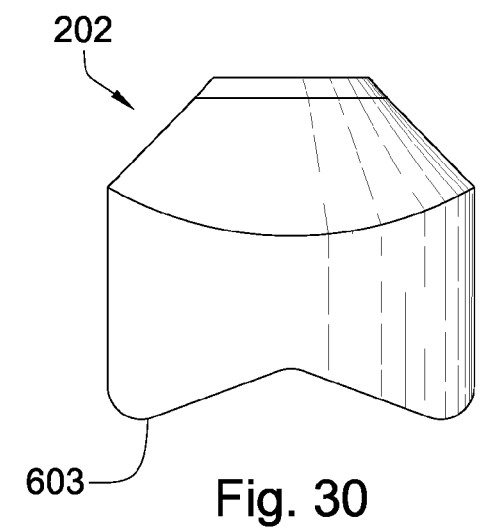
FIG. 30 is a cross sectional diagram of an embodiment depicting the tapered portion of an anvil.
Figure 31:
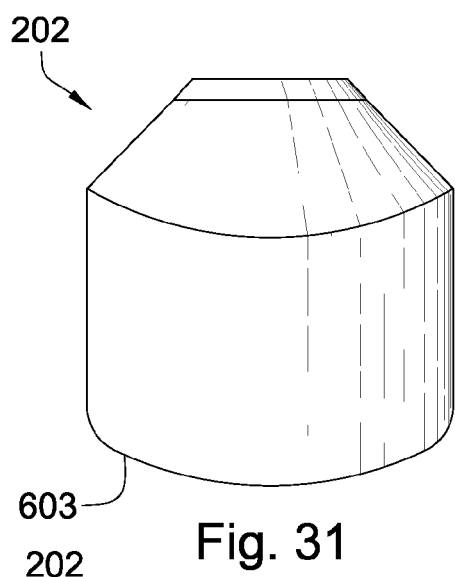
FIG. 31 is a cross sectional diagram of an embodiment depicting the cylindrical base of an anvil.
Figure 32:
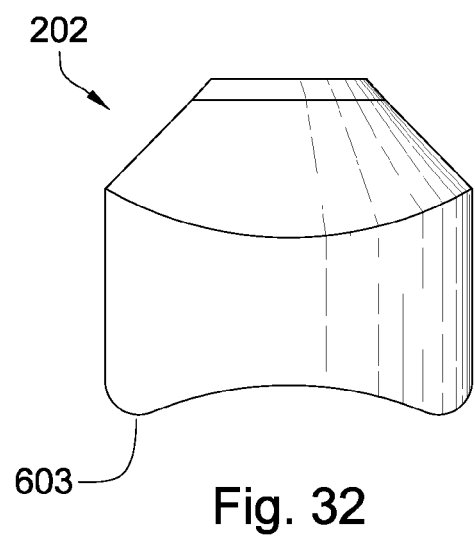
FIG. 32 is another cross sectional diagram of an embodiment depicting the cylindrical base of an anvil.
Figure 33:
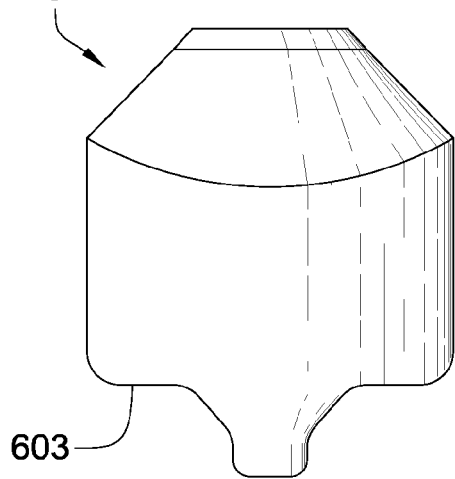
FIG. 33 is another cross sectional diagram of an embodiment depicting the cylindrical base of an anvil.
Figure 34:
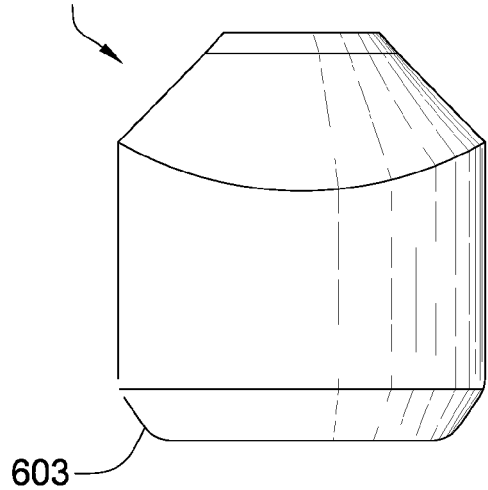
FIG. 34 is another cross sectional diagram of an embodiment depicting the cylindrical base of an anvil.

FIGS. 30-34 are cross sectional diagrams of various embodiments of an anvil 202 depicting various geometries of the cylindrical base 603 that may comprise a generally triangular shape, a generally dome shape, a generally scoop shape, a frustoconical shape, a chamfer. FIG. 30 depicts a cylindrical base 603 comprising a generally triangular shape. FIG. 31 depicts a cylindrical base 603 comprising a domed shape while FIG. 32 depicts a generally scoop shape. FIG. 33 depicts a generally frustoconical shaped cylindrical base 603 while FIG. 34 depicts a chamfered shape. In some embodiments the various geometries of the cylindrical base 603 may serve to compliment and further enhance the geometry of the back-up to effectively direct the stress loads towards the pressurized chamber of the press.

Figure 35:
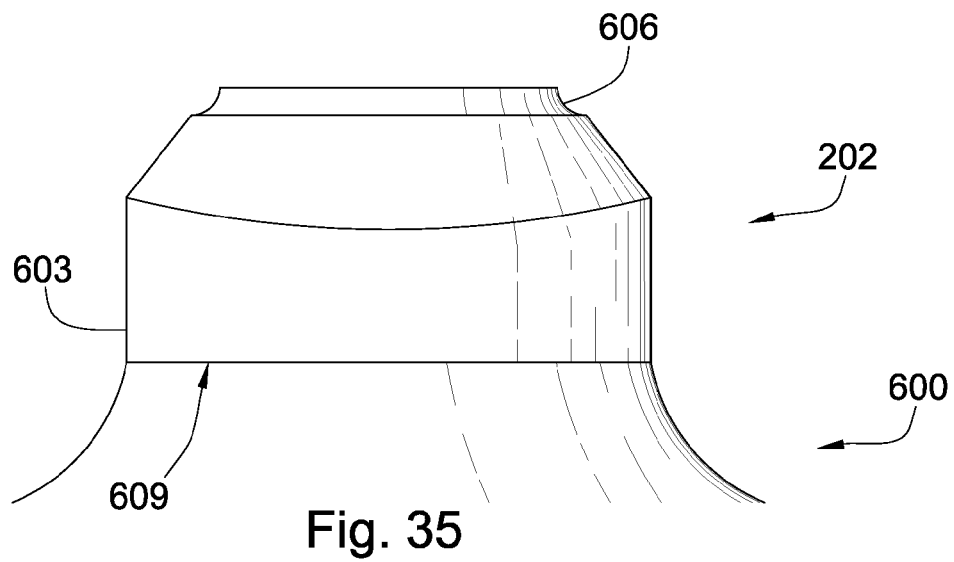
FIG. 35 is another cross sectional diagram of an embodiment depicting the cylindrical base of an anvil.
Figure 36:
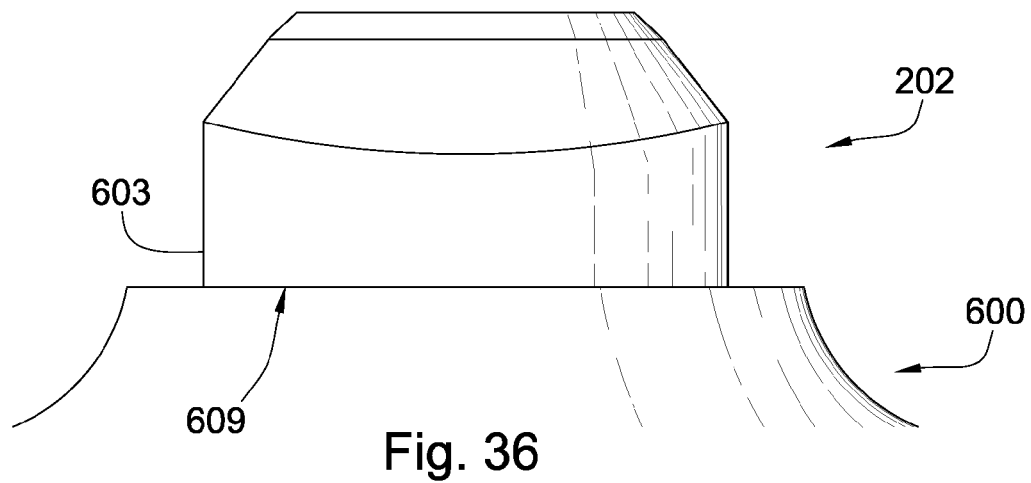
FIG. 36 is a cross sectional diagram of an embodiment depicting the cylindrical base of an anvil and the second interface of a back-up.
Figure 37:
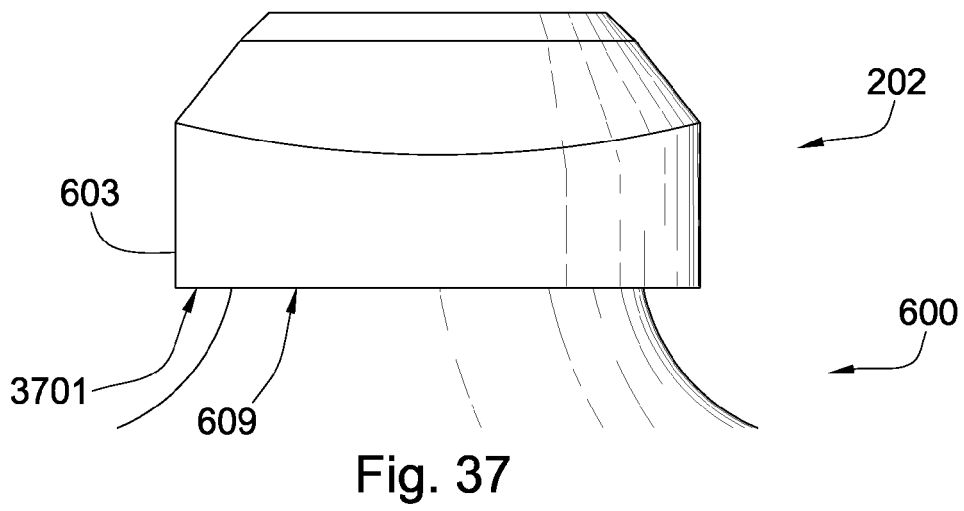
FIG. 37 is another cross sectional diagram of an embodiment depicting the cylindrical base of an anvil and the second interface of a back-up.

FIGS. 35-37 are cross sectional diagrams of various embodiments of an anvil 202 depicting a cylindrical base 603 comprising various diameters that may be mated with the first interface 608 of a back-up 600. FIG. 35 depicts a cylindrical base 603 that may comprise a diameter that is substantially equal to the second interface 609 of the backup 600. The embodiment also depicts a chamfered region 606 that may comprise a second surface area that further comprises a conic geometry. In yet other embodiments the second surface area may also comprise a radius. FIG. 36 depicts a cylindrical base 603 that may comprise a diameter that is larger than the diameter of a second interface 609 of the back-up 600. In another embodiment the cylindrical base 603 may comprise a diameter that is smaller than the diameter of second interface 609 of the back-up as shown in FIG. 37.

Figure 38:
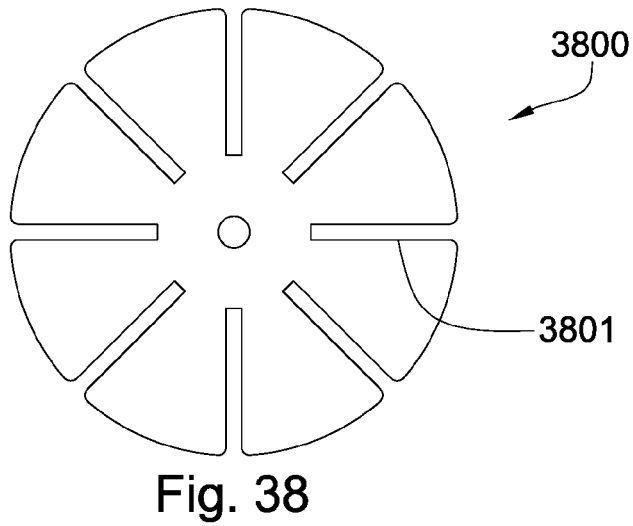
FIG. 38 is another cross sectional diagram of an embodiment depicting the cylindrical base of an anvil and the second interface of a back-up.
Figure 39:
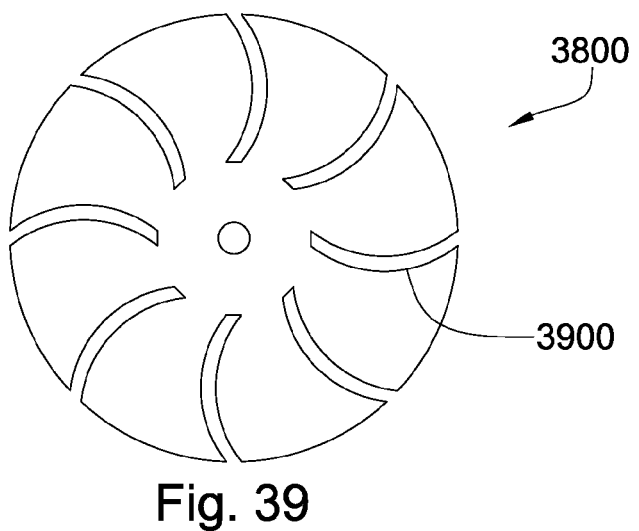
FIG. 39 is a cross sectional diagram of an embodiment depicting an electrical insulator.
Figure 40:
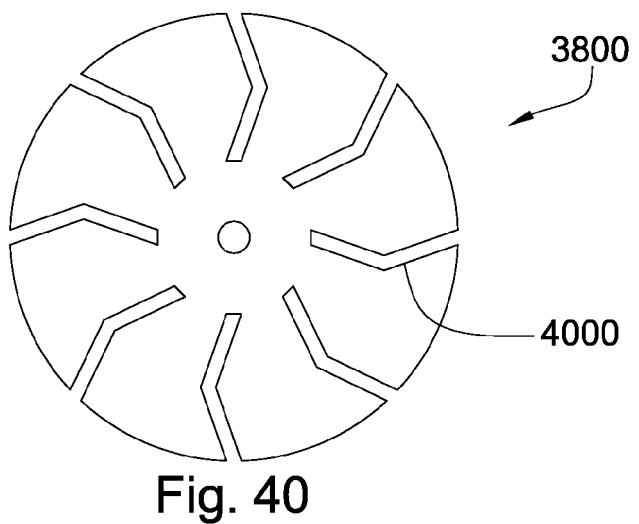
FIG. 40 is another cross sectional diagram of an embodiment depicting an electrical insulator.

FIGS. 38-40 are perspective diagrams of various embodiments of the current invention depicting an electrical insulation 3800 that may be disposed proximate the first interface 608 of the back-up and piston 601. The insulation may comprise a generally circular geometry having various laser cut sectionals disposed around the circumference of the insulation. The electrical insulation 3800 may be selected from the following material consisting of glass epoxy resin laminate, Kevlar, Teflon, compressed inorganic powder or combinations thereof. The electrical insulation 3800 may comprise a thickness of between 0.032 and 0.5 inches. Referring now to FIG. 38 which may comprise an electrical insulation 3800 comprising straight laser cut sectionals 3801, FIG. 39 may comprise an electrical insulation 3800 comprising generally curved sectionals 3900 while FIG. 40 may comprise an electrical insulation 3800 comprising generally jagged sectionals 4000. The sectionals may provide a certain degree of allowance and assist to prevent the insulation from shattering when subjected to intense pressure between the back-up 600 and the piston 601.

Figure 41:
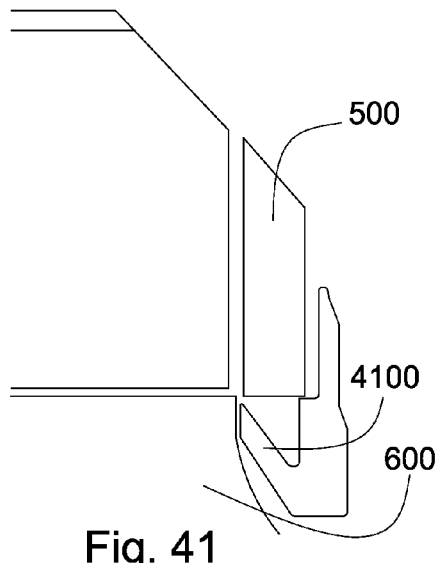
FIG. 41 is another cross sectional diagram of an embodiment depicting an electrical insulator.
Figure 42:
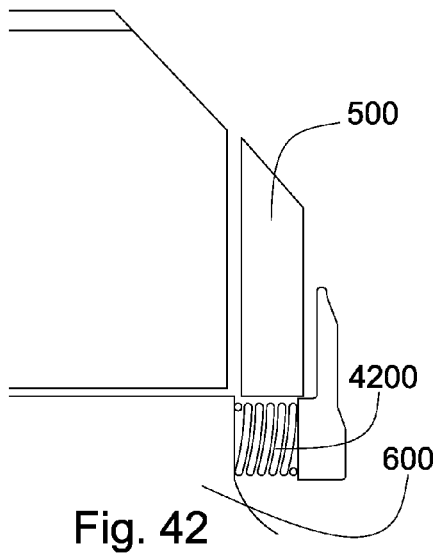
FIG. 42 is a cross sectional diagram of an embodiment depicting the centering assembly.
Figure 43:
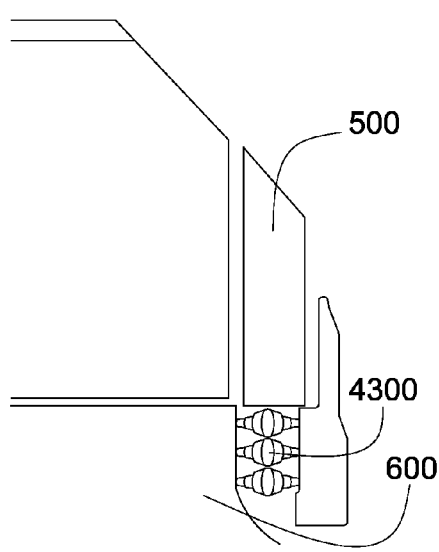
FIG. 43 is another cross sectional diagram of an embodiment depicting the centering assembly.
Figure 44:
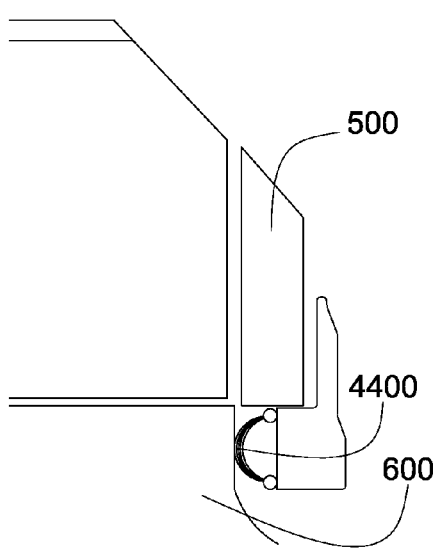
FIG. 44 is another cross sectional diagram of an embodiment depicting the centering assembly.

FIGS. 41-44 are cross sectional diagrams of various embodiments of the current invention depicting a centering assembly 500 that may also comprise a plurality of springs in contact with the back-up 600. In some embodiments the plurality of springs may assist to prevent the centering assembly 500 from being forced up into the pressurized chamber of the press by providing a small degree of allowance in the event that the back-up 600 begins to expand during operation. The spring assembly as shown in FIG. 41 may comprise a plurality of finger springs 4100, a plurality of compression springs 4200 in FIG. 42, a plurality of volute springs 4300 in FIG. 43 or a plurality leaf springs 4400 as in FIG. 44 disposed around the circumference of the back-up 600.

Figure 45:
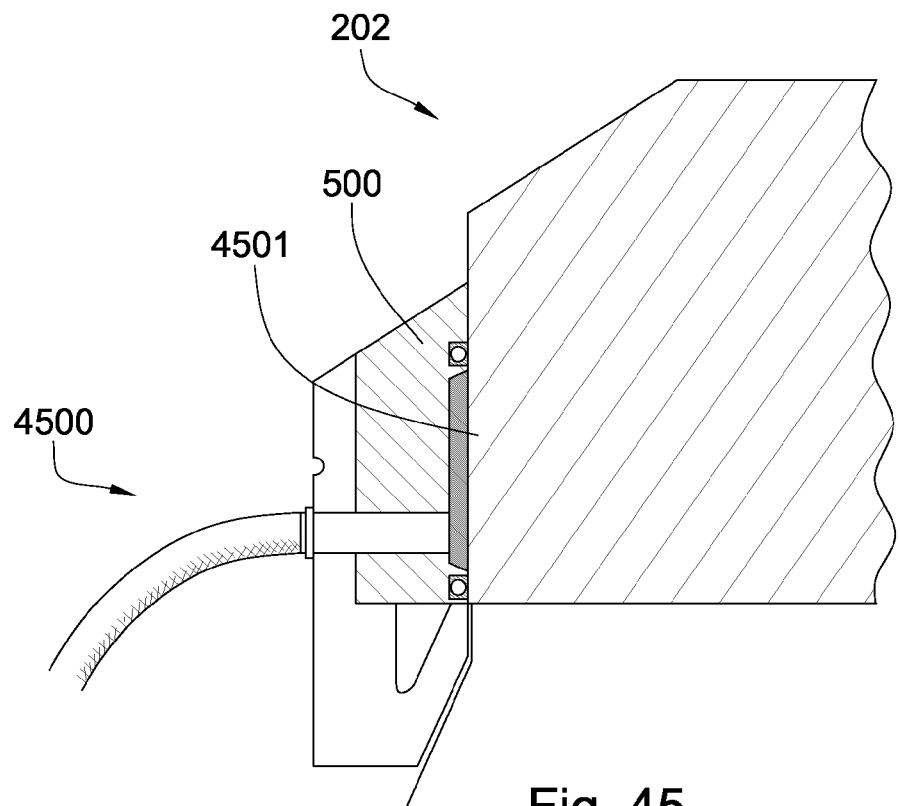
FIG. 45 is a cross sectional diagram of an embodiment depicting the cooling chamber.
Figure 46:
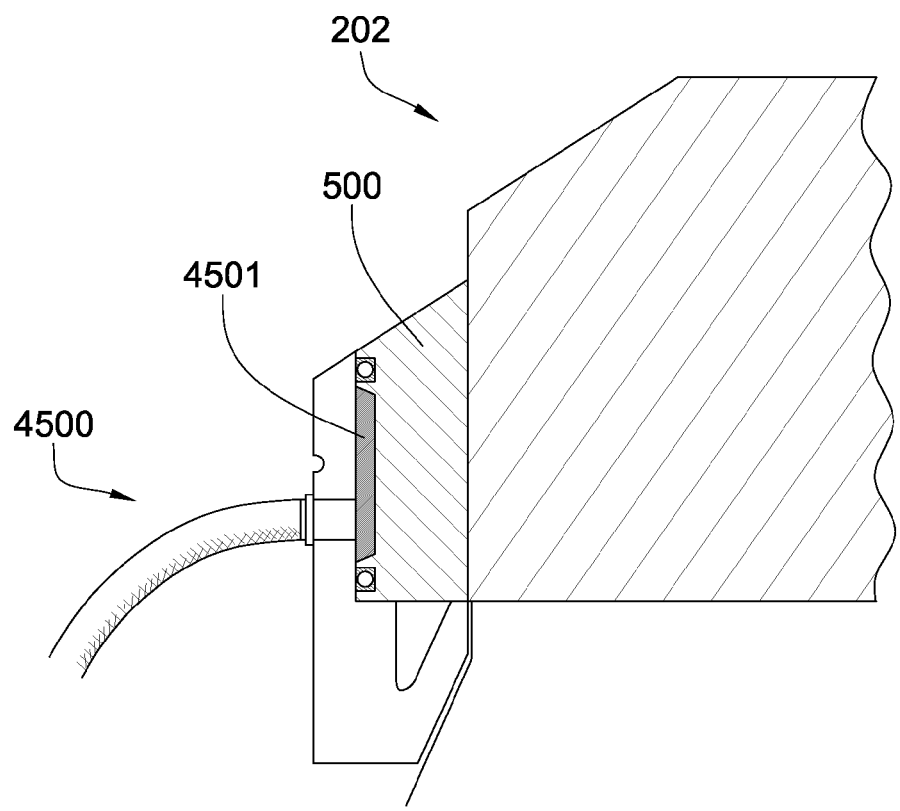
FIG. 46 is another cross sectional diagram of an embodiment depicting the cooling chamber.

FIGS. 45-46 are cross sectional diagrams of various embodiments of the current invention depicting a centering assembly 500 that may be disposed intermediate a key ring (not shown) and an anvil 202. The centering assembly 500 may comprise a cooling mechanism 4500 which comprises a chamber 4501 which may be adapted for flowing cooling fluid through. The cooling mechanism 4500 may assist to substantially cool the anvil 202 especially when subjected to such extremely high temperatures during operation. FIG. 45 depicts an embodiment of a chamber 4501 that may comprise an opening which exposes the cooling fluid directly to the anvil 202. In some embodiments this may assist to provide immediate cooling to the anvil and help to drastically lower the temperature of the anvil during operation. FIG. 46 however, depicts another embodiment wherein the cooling fluid is isolated from the anvil. In some embodiments this may help to prevent the chamber 4501 from being affected in the event that the anvil experiences some distortion during formation of the super hard material.

Figure 47:
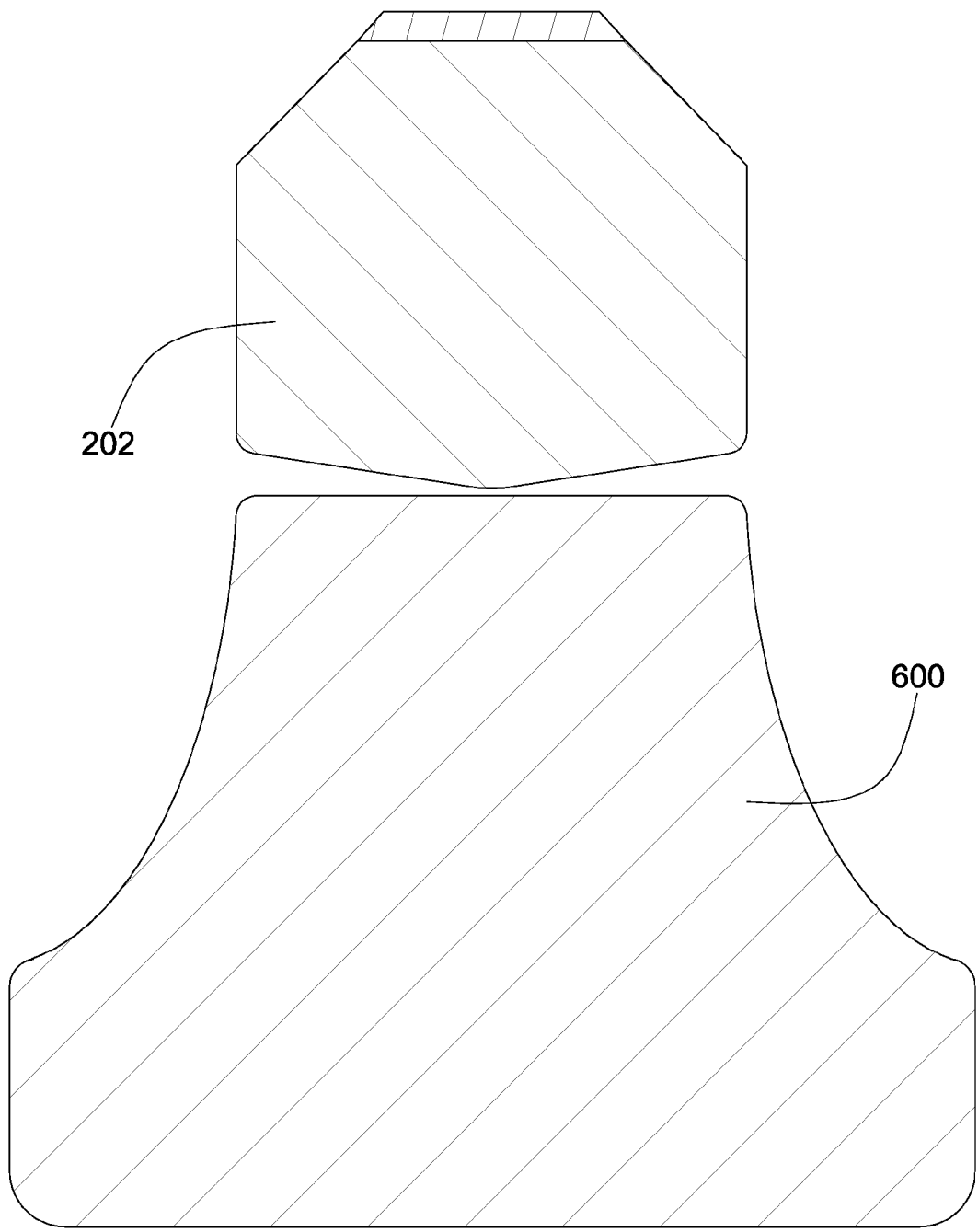
FIG. 47 is a cross sectional diagram of an embodiment of a back-up and anvil.

FIG. 47 is a cross sectional diagram of an embodiment of a back-up 600 and anvil 202. The distal end of the back-up comprises a non-planar geometry, while the proximal end of the back-up comprises a planar geometry. It is believed that such an arrangement may more evenly distribute the stress from the back-up to the anvil then if both ends were planar and avoid the stress concentrating at the periphery.

Whereas the present invention has been described in particular relation to the drawings attached hereto, it should be understood that other and further modifications apart from those shown or suggested herein, may be made within the scope and spirit of the present invention.

What is claimed is:

1. A cartridge assembly adapted for connection to a frame of a high pressure, high temperature press, comprising:
   a front end comprising a back up intermediate and coaxial with an anvil and a piston;
   the cartridge assembly comprising a hydraulic system adapted to apply axial pressure to the back-up through the piston;
   a central portion of the piston comprising a axial thickness approximately equal to the axial length of the back-up.

2. The cartridge assembly of claim 1, wherein a proximal end of the back-up fits within a recess formed in the piston.

3. The cartridge assembly of claim 2, wherein the recess comprises a cylindrical side wall and a bottom floor.

4. The cartridge assembly of claim 3, wherein a corner of the wall and floor form a concavity.

5. The cartridge assembly of claim 3, wherein the corner between the concavity form a radius.

6. The cartridge assembly of claim 3, wherein the concavity comprises a conic form factor of 0.6 to 0.9.

7. The cartridge assembly of claim 6, wherein at least a portion of a centering ring surrounding the back-up is disposed within the concavity.

8. The cartridge assembly of claim 6, wherein concavity comprise a depth of approximately 10 to 33 percent of the axial length of the side wall.

9. The cartridge assembly of claim 6, wherein the concavity comprise a depth and a width, wherein the depth is approximately twice the width.

10. The cartridge assembly of claim 3, wherein the side wall contacts a key ring adapted to interlock with adjacent cartridges when attached to the high pressure high temperature frame.

11. The cartridge assembly of claim 10, wherein the key ring comprises a plurality of slots adapted to receive locking pins adapted to center anvil.

12. The cartridge assembly of claim 11, wherein a centering assembly is disposed intermediate the key ring and the anvil.

13. The cartridge assembly of claim 12, wherein the centering assembly comprises a mechanism for cooling the anvil.

14. The cartridge assembly of claim 1, wherein the back-up is electrically insulated from the piston.

15. The cartridge assembly of claim 1, wherein a central open cavity is formed in the piston opposite an end proximate the back-up.

16. The cartridge assembly of claim 15, wherein the open cavity comprises a depth of about 50 to 90 percent of the axial thickness of the central portion of the piston.

17. The cartridge assembly of claim 16, wherein the open cavity comprises a width of about 75 to 125 percent of the depth of the open cavity.

18. The cartridge assembly of claim 1, wherein the axial thickness of the central portion of the piston is 40 to 80 percent of a radial thickness of the piston.

19. The cartridge assembly of claim 1, wherein a proximal end of the back-up comprises a geometry such that when the hydraulic system applies the axial pressure through the piston, that the piston distributes the load substantially evenly across a cross sectional area of the proximal end of the back-up.

20. The cartridge assembly of claim 1, wherein an end of the piston comprises a geometry such that when the hydraulic system applies the axial pressure through the piston, that the end of the piston distributes the load substantially evenly across a cross sectional area of the proximal end of the back-up.

* * * * *